United States Patent
Boswell et al.

(10) Patent No.: US 12,236,165 B2
(45) Date of Patent: Feb. 25, 2025

(54) METHODS AND SYSTEMS FOR DECOUPLING USER INPUT USING CONTEXT

(71) Applicant: HONEYWELL INTERNATIONAL INC., Charlotte, NC (US)

(72) Inventors: Steven Boswell, Phoenix, AZ (US); Sonia Dodd, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/296,246

(22) Filed: Apr. 5, 2023

(65) Prior Publication Data

US 2024/0338170 A1 Oct. 10, 2024

(51) Int. Cl.
*G06F 3/16* (2006.01)

(52) U.S. Cl.
CPC .................... *G06F 3/167* (2013.01)

(58) Field of Classification Search
CPC . G06F 3/167; G06F 3/048; B64D 2045/0075; B64D 43/00; G10L 15/22
See application file for complete search history.

(56) References Cited

U.S. PATENT DOCUMENTS

| | | | |
|---|---|---|---|
| 4,130,884 A | 12/1978 | Hildinger | |
| 6,421,645 B1 | 7/2002 | Beigi et al. | |
| 7,299,187 B2 | 11/2007 | Tahara et al. | |
| 7,458,029 B2 | 11/2008 | Agrawala et al. | |
| 7,620,901 B2 | 11/2009 | Carpenter et al. | |
| 8,347,215 B2 | 1/2013 | Carpenter et al. | |
| 8,515,763 B2 | 8/2013 | Dong et al. | |
| 9,392,326 B2 | 7/2016 | Lee et al. | |
| 9,569,174 B2 | 2/2017 | Rogers et al. | |
| 9,959,861 B2 | 5/2018 | Zhou et al. | |
| 9,965,035 B2 | 5/2018 | Santamaria et al. | |
| 9,983,664 B2 | 5/2018 | Kim et al. | |
| 9,996,231 B2 | 6/2018 | Missig et al. | |
| 10,074,367 B2 | 9/2018 | Toyama | |
| 10,127,564 B2 | 11/2018 | Heath | |

(Continued)

FOREIGN PATENT DOCUMENTS

| | | |
|---|---|---|
| CN | 104570835 A | 4/2015 |
| CN | 113936650 A | 1/2022 |

(Continued)

*Primary Examiner* — Andrey Belousov
(74) *Attorney, Agent, or Firm* — Lorenz & Kopf LLP

(57) ABSTRACT

Vehicle systems and methods are provided for decoupling user input devices and software applications using contextual information. One method involves a user input management service receiving an input context message from an interactive application identifying an anticipated data type to be received by the interactive application, maintaining an association between the anticipated data type and the interactive application, identifying an input data type associated with a received user input, and when the input data type matches the anticipated data type, broadcasting, by the user input management service, a message including an indication of the input data type and an input value of the received user input for the input data type to the interactive application, wherein the interactive application responds to the input value for the input data type.

19 Claims, 5 Drawing Sheets

(56) References Cited

U.S. PATENT DOCUMENTS

| | | |
|---|---|---|
| 10,191,619 B2 | 1/2019 | Yoon et al. |
| 10,445,355 B2 | 10/2019 | Miller et al. |
| 10,447,744 B2 | 10/2019 | Feldman et al. |
| 10,558,351 B2 | 2/2020 | Shan |
| 10,664,122 B2 | 5/2020 | Choi et al. |
| 10,969,945 B2 | 4/2021 | Bernstein et al. |
| 10,991,364 B1 | 4/2021 | Hoover et al. |
| 11,002,558 B2 | 5/2021 | Santamaria et al. |
| 11,144,535 B2 | 10/2021 | Gilbertson et al. |
| 11,221,729 B1 | 1/2022 | Bauchot et al. |
| 11,467,711 B2 | 10/2022 | Ma et al. |
| 11,714,539 B1 | 8/2023 | Boswell et al. |
| 2002/0036660 A1 | 3/2002 | Adan et al. |
| 2003/0066016 A1 | 4/2003 | Wehage |
| 2005/0180327 A1 | 8/2005 | Banerjee et al. |
| 2006/0168531 A1 | 7/2006 | Sato |
| 2006/0212291 A1 | 9/2006 | Matsuo |
| 2007/0052725 A1 | 3/2007 | Ostojic et al. |
| 2007/0153806 A1 | 7/2007 | Celinski et al. |
| 2007/0226636 A1 | 9/2007 | Carpenter et al. |
| 2007/0288129 A1 | 12/2007 | Komer et al. |
| 2010/0180210 A1 | 7/2010 | Toyama et al. |
| 2010/0293501 A1 | 11/2010 | Russ et al. |
| 2012/0110403 A1 | 5/2012 | Chen et al. |
| 2013/0104065 A1 | 4/2013 | Stecher |
| 2013/0162519 A1 | 6/2013 | Ameling et al. |
| 2013/0241840 A1* | 9/2013 | Durojaiye ............ G06F 3/0416 345/173 |
| 2014/0019873 A1 | 1/2014 | Gupta et al. |
| 2014/0040756 A1 | 2/2014 | Bukurak et al. |
| 2014/0169471 A1* | 6/2014 | He ........................ H04N 19/61 375/240.16 |
| 2014/0363799 A1* | 12/2014 | Brown ................... G09B 5/065 434/247 |
| 2016/0034065 A1 | 2/2016 | Yin et al. |
| 2016/0267773 A1 | 9/2016 | Martin |
| 2016/0321841 A1 | 11/2016 | Christen et al. |
| 2016/0360382 A1 | 12/2016 | Gross et al. |
| 2020/0233501 A1 | 7/2020 | Jacobs |
| 2020/0249811 A1 | 8/2020 | Lemay et al. |
| 2020/0264738 A1 | 8/2020 | Lee et al. |
| 2021/0263600 A1 | 8/2021 | Starrett et al. |
| 2021/0342785 A1 | 11/2021 | Mann et al. |
| 2022/0100463 A1 | 3/2022 | Crouch et al. |

FOREIGN PATENT DOCUMENTS

| | | |
|---|---|---|
| CN | 111338555 B | 3/2022 |
| CN | 114327235 A | 4/2022 |
| EP | 1487171 A1 | 12/2004 |
| EP | 3998527 A2 | 5/2022 |
| JP | 2013239137 A | 11/2013 |
| JP | 7051756 B2 | 4/2022 |
| WO | 2019063496 A1 | 4/2019 |
| WO | 2021184375 A1 | 9/2021 |
| WO | 2022005819 A1 | 1/2022 |
| WO | 2022143198 A1 | 7/2022 |

* cited by examiner

METHODS AND SYSTEMS FOR DECOUPLING USER INPUT USING CONTEXT

TECHNICAL FIELD

The subject matter described herein relates generally to vehicle systems, and more particularly, embodiments of the subject matter relate to decoupling user input and receiving applications for aircraft systems and related cockpit touchscreen displays.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the user can obtain information or perform functions related to, for example, navigation, flight planning, guidance and navigation, and performance management. The cockpit of an aircraft is often equipped with any number of different user input devices, such as, joysticks, knobs, buttons, keys, cursor control devices (CCDs) and the like, along with touchscreens, touch panels, audio input devices, and other emerging technologies.

Traditionally, a user input device may be linked to an avionics system or other software application for directly receiving user input from the user input device. However, it is desirable to decouple the sources or generators of user input from the recipients of the user input, for example, to provide improved flexibility and interoperability as well as accommodating retrofitting or upgrading while maintaining reliability and resiliency by reducing the amount of modifications required in the cockpit, which in turn may reduce costs or need for recertification. Other desirable features and characteristics will become apparent from the subsequent detailed description and the appended claims, taken in conjunction with the accompanying drawings and this background.

BRIEF SUMMARY

Vehicle systems and methods are provided for decoupling user input devices and software applications using contextual information. An exemplary method involves a user input management service receiving an input context message from an interactive application identifying an anticipated data type to be received by the interactive application, maintaining an association between the anticipated data type and the interactive application, identifying an input data type associated with a received user input, and when the input data type matches the anticipated data type, broadcasting a message including an indication of the input data type and an input value of the received user input for the input data type to the interactive application, wherein the interactive application responds to the input value for the input data type.

An apparatus for a computer-readable medium is also provided. The computer-readable medium has computer-executable instructions stored thereon that, when executed by a processing system, cause the processing system to receive an input context message from an interactive application identifying an anticipated data type to be received by the interactive application, maintain an association between the anticipated data type and the interactive application, identify an input data type associated with a received user input from a user input device, and when the input data type matches the anticipated data type, broadcast a message including an indication of the input data type and an input value of the received user input for the input data type to the interactive application, wherein the interactive application responds to the input value for the input data type.

A system is also provided that includes a first user input device to provide a first user input, a second user input device to provide a second user input, and an interactive application to provide an input context message in response to the first user input. The input context message identifies an anticipated data type expected to be received by the interactive application. The system includes a user input management service coupled to the first user input device, the second user input device, and the interactive application to maintain an association between the anticipated data type and the interactive application, identify an input data type associated with the second user input, and when the input data type matches the anticipated data type, broadcast a message including an indication of the input data type and an input value of the second user input for the input data type to the interactive application, wherein the interactive application responds to the input value for the input data type.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF DRAWINGS

Exemplary embodiments of the subject matter of the present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to electrically controlled vehicle systems. For purposes of explanation, the subject matter is described herein primarily in the context of a flight deck display, an electronic flight bag (EFB) or other cockpit display onboard an aircraft in an aviation context. However, it should be understood that the subject matter described herein is not necessarily limited to use with aircraft or other vehicle systems or applications and may be similarly utilized in other application, systems or environments, including, but not limited to use with other types of vehicles (e.g., automobiles, marine vessels, trains, etc.).

Figure 1:
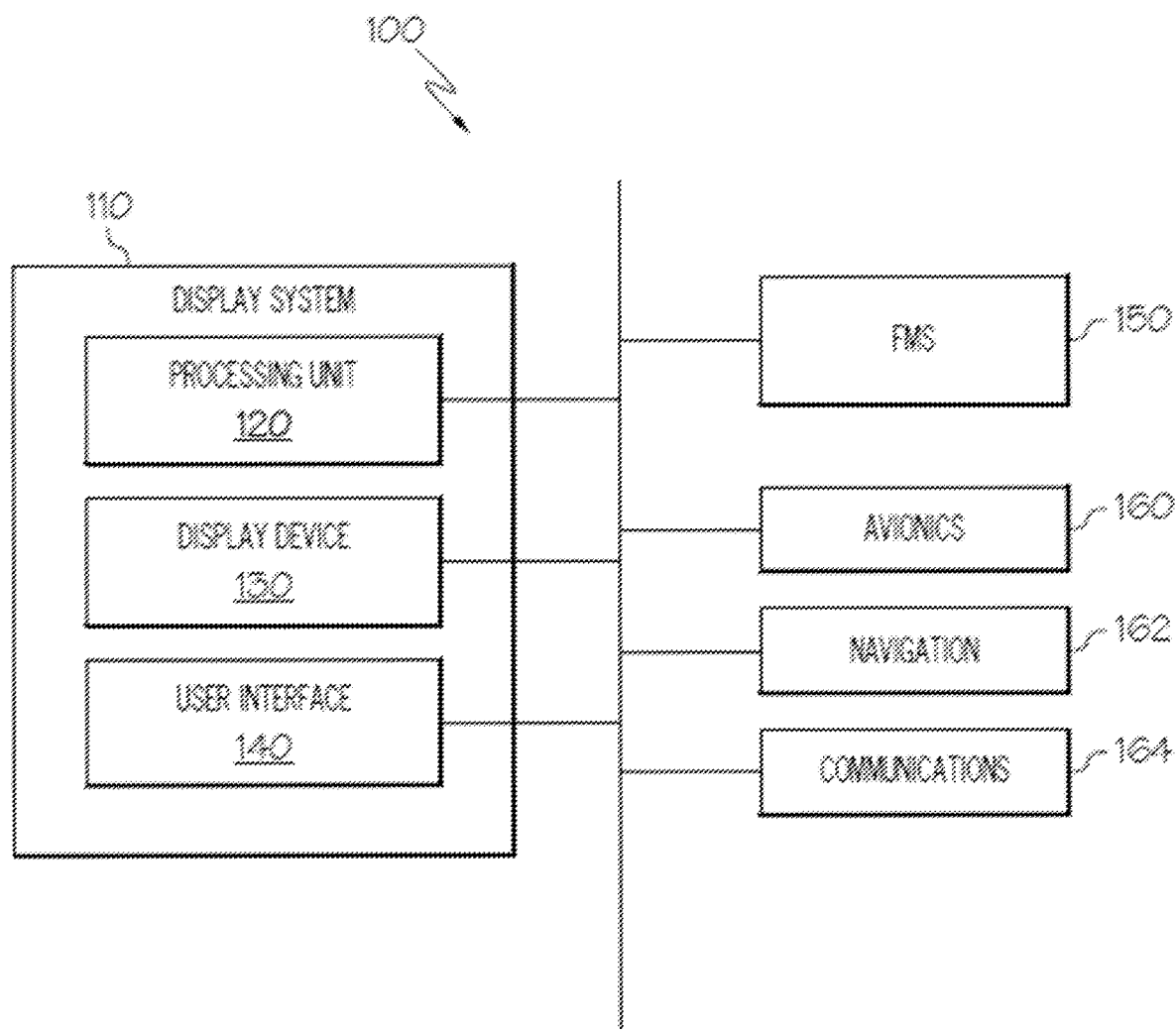
FIG. 1 is a block diagram of a system for an aircraft in accordance with one or more exemplary embodiments.

FIG. 1 is a schematic representation of an aircraft system 100 with a visual display system 110 coupled to a flight management system (FMS) 150 and one or more data sources 160, 162, 164. The components and subcomponents of system 100 may be coupled together in any suitable manner, such as with a data bus. Although the system 100 appears in FIG. 1 to be arranged as an integrated system, the subject matter described herein is not so limited and can also include an arrangement whereby one or more aspects of the system 100 are separate components or subcomponents of another system located either onboard or external to the aircraft.

The visual display system 110 includes a processing unit 120, a display device 130, and a user interface 140. Generally, the visual display system 110 displays information from the FMS 150 via the display device 130 and enables interaction between a user (e.g., a pilot or other type of operator) and the FMS 150, as described in greater detail below.

In one or more embodiments, the processing unit 120 is a computer processor associated with flight planning and management functions, particularly the display and navigation of a list of waypoints, such as in a flight plan. In one exemplary embodiment, the processing unit 120 functions to at least receive and/or retrieve aircraft flight management information (e.g., from the FMS 150 and data sources 160, 162, 164). The processing unit 120 may also generate display commands for displaying the flight management information. In this regard, the processing unit 120 may function as a graphics display generator to generate display commands based on algorithms or other machine instructions stored in the processing unit 120 or in separate memory components. The processing unit 120 may then send the generated display commands to display device 130 for presentation to the user. The processing unit 120 may additionally receive and generate display commands based on inputs via the user interface 140.

Depending on the embodiment, the processing unit 120 may be implemented or realized with a general-purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 120 includes processing logic that may be configured to carry out the functions, techniques, and processing tasks or methods associated with operation of the system 100. The processing unit 120 may further include any suitable type of memory or data storage, such as for example, RAM, ROM, EEPROM, flash memory, optical or magnetic storage devices, or any other medium that can be used to store and access desired information.

The display device 130 is coupled to the processing unit 120 for rendering information to the user based on display commands. In one exemplary embodiment, the display device 130 may be a multifunction monitor, unit, or any display suitable for displaying various symbols and information, such as a multifunction control display unit (MCDU), cockpit display device (CDU), primary flight display (PFD), and/or navigation display. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs. HUDs, and the like.

In exemplary embodiments, the user interface 140 is coupled to the processing unit 120 to allow a user to interact with the display device 130 and/or other elements of the system 100. The user interface may be realized as a keypad, touchpad, keyboard, mouse, touch panel, joystick, knob, line select key or another suitable device adapted to receive input from a user. In further embodiments, the user interface 140 is realized as audio input and output devices, such as a speaker, microphone, audio transducer, audio sensor, or the like. In some embodiments, the user interface may be incorporated into the display device 130. For example, in one or more embodiments, the display device 130 and user interface 140 are integrated as an interactive MCDU with a display screen and a keyboard, touchscreen and/or other mechanisms for function, display, and/or cursor control.

The FMS 150 is coupled to the display system 110 and one or more data sources 160, 162, 164 and generally functions to support navigation, flight planning, and other aircraft control functions, as well as provides real-time data and/or information regarding the operational status of the aircraft. The FMS 150 may include or otherwise access one or more of the following: a weather system, an air traffic management system, a radar system, a traffic avoidance system, an autopilot system, a flight control system, crew alerting systems, electronic checklist systems, an electronic flight bag, and/or other suitable avionics systems. In particular, the FMS 150 may store and/or generate a flight plan for traveling between a current or initial destination and a final destination.

The data sources 160, 162, 164 can include any suitable type of data source that may be used to construct or modify the flight plan, such as an avionics database 160, a navigation system 162, and a communications system 164, as examples. The avionics database 160 may store aeronautical information data, including, for example, flight plan data, data related to airways, navigational aids, navigational data, obstructions, taxi registration, Special Use Airspace, political boundaries, COM frequencies, approach information, geographical information and the like. The navigation system 162 is configured to provide real-time navigational data and/or information regarding operation of the aircraft. The communications system 164 is suitably configured to support communications between the aircraft and another aircraft or ground location (e.g., air traffic control) via a radio system or another suitable data link system.

In one or more exemplary implementations, the display system 110 particularly functions to display a flight plan, including as examples, a selected or otherwise designated flight plan for subsequent execution, a flight plan selected for review, and/or a flight plan currently being executed by the aircraft. In some embodiments, the FMS 150 may store predefined flight plans, while in further embodiments, the flight plan may be uplinked via the communications system 164 and/or manually entered or created by the user via the user interface 140. In one or more exemplary embodiments, the display system 110 renders or otherwise provides a lateral map or other navigational map that includes a graphical representation of at least a portion of the route defined by the flight plan. In addition to the displayed flight plan flight path, the lateral map may also include graphical representations of terrain, meteorological conditions, navigational reference points (e.g., waypoints, navigational aids, distance measuring equipment (DMEs), very high frequency omni-directional radio ranges (VORs), and the like), designated special use airspaces or airspace restrictions, air traffic, obstacles, and/or the like. In this regard, the lateral map may include different layers of graphical elements that are based on or otherwise derived from different data sources, which, in some embodiment, may be selectively added or removed from the display. Additionally, graphical elements in different data layers may be collocated or otherwise correspond to overlapping geographic locations or regions, such that different types of graphical elements may overlie one another on the display.

In exemplary embodiments, the flight plan includes a sequence of navigational reference points or waypoints that define a flight path or route to be flown by the aircraft. In practice, waypoints may have various types of characteristics, attributes, or properties associated therewith. These characteristics may be a function of the waypoint itself or a function of the placement of the waypoint within the flight plan. For example, a waypoint may be associated with a particular type of aircraft procedure (e.g., a turn or holding procedure) or be associated with a designated constraint, such as noise, altitude, and/or speed constraints. As further examples, a waypoint may be associated with a specific segment of the flight plan (e.g., departure, en route, approach, missed approach, and/or alternate flight plan). One or more of the characteristics, attributes and/or properties associated with a given waypoint may be presented in association with that waypoint when that waypoint is currently selected.

Generally, the FMS 150 may associate different characteristics to waypoints of a flight plan based on various factors. For example, the FMS 150 may determine some waypoint characteristics based on information from the navigation system 162 and/or avionics database 160 (e.g., identifying a waypoint as a runway or compulsory reporting point; identifying stored defined patterns associated with the waypoint, such as procedure turns, published holding patterns, etc.) or based on flight plan modifications (e.g., the crew and/or operator may insert a holding pattern at a specific waypoint as instructed by ground station). In practice, the FMS 150 may evaluate and divide the entire flight plan to map the waypoints to specific flight phases (or segments), e.g., departure, en-route, arrival procedures, etc. For example, the FMS 150 can assign waypoints from origin to top of climb as departure waypoints; from top of climb to top of descent including any step climbs as en-route waypoints; and from top of descent to destination as arrival waypoints. In this manner, the FMS 150 may identify different logical groupings of waypoints according to logically distinct operational segments of the flight plan.

In one or more implementations, the display system 110 and/or processing unit 120 displays, renders or otherwise presents a navigational map graphical user interface (GUI) display on a display device 130 onboard an aircraft. A navigational map generally includes a graphical representation of a portion of route defined by a flight plan for the aircraft and a graphical representation of the aircraft overlaid or rendered on top of a background. Depending on the implementation, the background may include graphical representations of the terrain, topology, navigational reference points, airspace designations and/or restrictions, or other suitable items or points of interest corresponding to the currently displayed area of the navigational map, based upon corresponding data which may be maintained in a terrain database, a navigational database, a geopolitical database, or another suitable database. For example, the display system 110 and/or processing unit 120 may render a graphical representation of navigational aids (e.g., VORs, VORTACs, DMEs, and the like) and airports within the currently displayed geographic area of the navigational map overlying the background. Some embodiments of the navigational map may also include graphical representations of airspace designations and/or airspace restrictions, cities, towns, roads, railroads, and other geo-political information. Depending on the implementation, the navigational map may depict a top view (e.g., from above the aircraft), alternatively referred to as a lateral map or lateral view, or various perspective views, such as side views, three-dimensional views (e.g., a three-dimensional synthetic vision display), angular or skewed views, and the like. The displayed area of the navigational map generally corresponds to the geographic area that is currently displayed in the navigational map, that is, the field of view about the center location of the navigational map. In this regard, the center location of the navigational map may correspond to a reference geographic location for the middle or geometric center of the navigational map.

In one or more exemplary embodiments, the navigational map is associated with the movement of the aircraft, and the aircraft symbology and/or background refreshes or otherwise updates as the aircraft travels, such that the graphical representation of the aircraft is positioned over the terrain background in a manner that accurately reflects the current (e.g., instantaneous or substantially real-time) real-world positioning of the aircraft relative to the earth. In some embodiments, the aircraft symbology is shown as traveling across the navigational map (e.g., by updating the location of the aircraft symbology with respect to the background), while in other embodiments, the aircraft symbology may be located at a fixed position on the navigational map (e.g., by updating the background with respect to the aircraft symbology such that the map is maintained centered on and/or aligned with the aircraft symbology). Additionally, depending on the embodiment, the navigational map may be oriented in a cardinal direction (e.g., oriented north-up so that moving upward on the map corresponds to traveling northward), or alternatively, the orientation of the navigational map may be track-up or heading-up (i.e., aligned such that the aircraft symbology is always traveling in an upward direction and the background adjusted accordingly).

Figure 2:
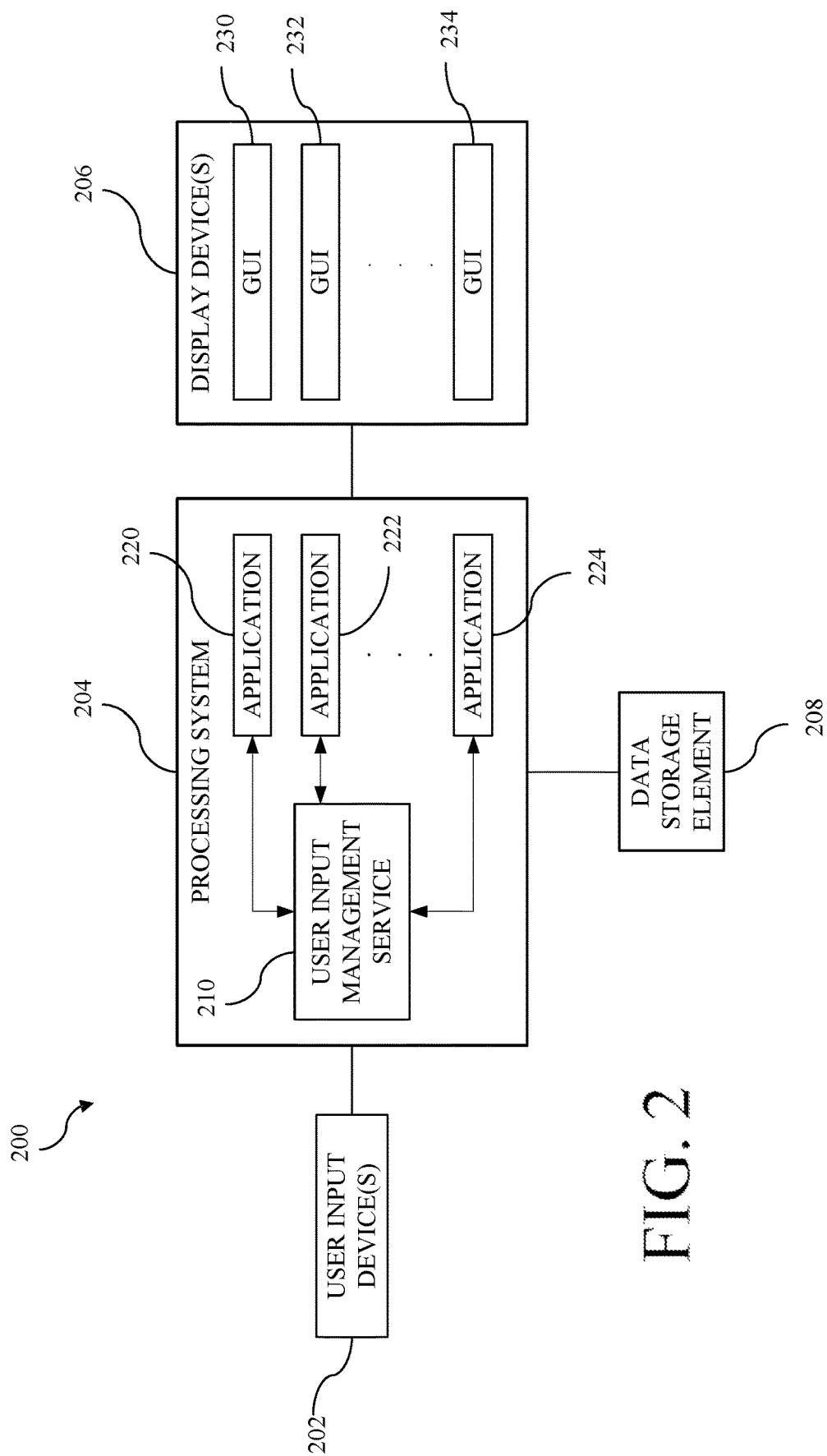
FIG. 2 depicts an exemplary display system suitable for use with the aircraft system of FIG. 1 in one or more exemplary embodiments.

FIG. 2 depicts an exemplary embodiment of a display system 200 suitable for use in a vehicle system, such as the aircraft system 100 of FIG. 1. The display system 200 includes, without limitation, one or more user input devices 202 (e.g., user interface 140) that are coupled to a processing system 204 (e.g., processing unit 120) that supports user interaction with one or more GUI displays 230, 232, 234 that are displayed, rendered or otherwise provided on one or more display devices 206 (e.g., display device 130) that are coupled to the processing system 204. It should be appreciated that FIG. 2 is a simplified representation of the display system 200 for purposes of explanation and is not intended to be limiting.

The user input device(s) 202 generally represent the human-machine interface hardware components that allow a user (e.g., a pilot, co-pilot, or crew member) to interact with the GUI displays 230, 232, 234 provided on the display device(s) 206 and/or other elements coupled to the display system 200 (e.g., the FMS 150 or other onboard avionics systems 160, 162, 164). Depending on the embodiment, the user input device(s) 202 may include or otherwise be realized as a cursor control device (CCD), keypad, touchpad, keyboard, mouse, touch panel (or touchscreen), joystick, knob, line select key or another suitable device adapted to receive input from a user, including microphones or other audio input devices. The display device(s) 206 generally represent the electronic display hardware capable of graphically displaying information (e.g., flight information or other data associated with operation of the aircraft) under control of the processing system 204.

The processing system 204 generally represents the hardware, software, and/or firmware components configured to facilitate communications and/or interaction between the user input device(s) 202, the display device(s) 206 and potentially other elements coupled to the display system 200 (e.g., the FMS 150 or other onboard avionics systems 160, 162, 164) and perform additional tasks and/or functions to support operation of the display system 200, as described in greater detail below. Depending on the embodiment, the processing system 204 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 204 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 204 includes processing logic that may be configured to carry out the functions, techniques, and processing tasks associated with the operation of the display system 200, as described in greater detail below. Furthermore, the steps of a method or algorithm described in connection with the embodiments disclosed herein may be embodied directly in hardware, in firmware, in a software module executed by the processing system 204, or in any practical combination thereof. For example, in one or more embodiments, the processing system 204 includes or otherwise accesses a data storage element 208 (or memory), which may be realized as any sort of non-transitory short or long term storage media capable of storing computer-readable (or machine-readable) programming instructions for execution by the processing system 204. The code or other executable programming instructions, when read and executed by the processing system 204, cause the processing system 204 to support or otherwise perform certain tasks, operations, functions, and/or processes described herein.

In exemplary embodiments described herein, the code or other executable programming instructions maintained at the data storage element 208 are configurable to cause the processing system 204 to execute, generate or otherwise support a user input management service 210 that functions as an intermediary between the user input device(s) 202 and any number of different display software applications 220, 222, 224 that are configurable to render, display, generate or otherwise provide one or more corresponding GUI elements or displays 230, 232, 234 on the display device(s) 206. In this regard, it should be noted that although FIG. 2 depicts the different display software applications 220, 222, 224 being executed, generated or otherwise supported by the processing system 204 (e.g., based on respective code or executable programming instructions maintained in memory 208), in practice, one or more of the display software applications 220, 222, 224 may be implemented by or at another component, which may be external to the display system 200 (e.g., the FMS 150 or other onboard avionics systems 160, 162, 164 coupled to the display system 110). Moreover, although FIG. 2 depicts a one to one relationship between the different display software applications 220, 222, 224 and the GUI displays 230, 232, 234, in practice, an individual display software application 220, 222, 224 may control, render or otherwise provide any number of different GUI elements or displays on the display device(s) 206. In this regard, the implementation details of the different display software applications 220, 222, 224 is not germane to the subject matter described herein.

In exemplary implementations, the user input management service 210 functions as an intermediary that effectively decouples any number of different user input devices 202 from any number of potential destination applications 220, 222, 224 for receiving user input. In this regard, in some implementations, the applications 220, 222, 224 notify or otherwise register the particular regions (or ranges of locations) where a GUI display 230, 232, 234 associated with that respective application 220, 222, 224 is depicted (e.g., by providing a range of pixel coordinate locations encompassed by a layer of the GUI display 230, 232, 234), thereby allowing the user input management service 210 to effectively create and maintain a hierarchical arrangement of different GUI layers associated with the different applications 220, 222, 224 for the different locations or regions of the display device(s) 206 where GUI displays 230, 232, 234 are presented. In such implementations, when a user input is initiated, the user input management service 210 utilizes the initial location information contained in the initial message (s) of the user input message stream received from the respective user input device 202 to identify which application 220, 222, 224 is associated with the top or uppermost layer in the hierarchical arrangement at that location on a display device 206. The user input management service 210 provides indicia of the user input at the initial user input location to the respective application(s) 220, 222, 224 registered at that location, where the respective gesture recognizer associated with the respective application(s) 220, 222, 224 identifies or otherwise determines whether and how to respond to the user input. In this regard, a gesture recognizer is a software component associated with or assigned to a particular region of a display that includes, encompasses or otherwise corresponds to an interactive feature, element or functionality of the respective software application 220, 222, 224.

When the gesture recognizer associated with the respective application(s) 220, 222, 224 determines the user input should be responded to (e.g., by virtue of the user input corresponding to selection of a GUI element or other interactive feature of the respective GUI display 230, 232, 234), the respective application 220, 222, 224 notifies the user input management service 210, which, in turn, maintains an association between the message stream for that user input and the respective application 220, 222, 224 having the highest position in the hierarchical arrangement (e.g., the application 220, 222, 224 associated with the GUI display 230, 232, 234 that overlies or is in front of other GUI displays 230, 232, 234 at that location) as being the originating application with respect to which the user input originated, such that the user input does not fall through to a lower layer on the display device 206. In other words, by virtue of the association, the associated application 220, 222, 224 is effectively subscribed to the message stream and the user input management service 210 routes messages associated with a particular message stream to its assigned application 220, 222, 224 subscribed to that message stream, so that any user input or other cursor interaction starting within the boundaries of a region associated with a particular gesture recognizer of the assigned application 220, 222, 224 is captured and subsequently interpreted solely by that gesture recognizer, even though the user input may move outside the boundary of the GUI display 230, 232, 234 associated with the assigned application 220, 222, 224.

In practice, a user may provide user input intended for a particular application 220, 222, 224 being interacted with via another user input device 202 (or via another user input message stream) that is not associated with that particular application 220, 222, 224. For example, in concert with using a physical or tactile user input device 202 to interact with a software application 220, 222, 224, a user may concurrently desire to use an audio input device 202 or another user input device 202 to input or otherwise provide data or other information to that same software application 220, 222, 224. In this regard, in exemplary embodiments described herein, the user input management service 210 utilizes contextual information to effectively route user input from a user input device 202 that is decoupled or otherwise not associated with a particular software application 220, 222, 224 to that particular software application 220, 222, 224, thereby allowing the user to seamlessly provide user input to a particular software application 220, 222, 224 via different user input devices 202 without any additional workload on behalf of the user.

As described in greater detail below, the user input management service 210 receives an input context message from a software application 220, 222, 224 that identifies an anticipated type of data expected to be received, by way of user input, by the interactive application. For example, in response to user selection of a GUI element or other interactive feature associated with an interactive software application 220, 222, 224 to input, define, modify or otherwise configure a value of a particular type of data, the respective software application 220, 222, 224 may transmit or otherwise provide a corresponding message to the user input management service 210 that identifies that particular data type that the software application 220, 222, 224 is anticipating receiving after or otherwise in response to the user selection. In response to receiving the input context message, the user input management service 210 instantiates and maintains an association between the anticipated data type identified by the input context message and the interactive application 220, 222, 224 that input context message was received from. For example, a user may interact with an FMS application (e.g., an interactive application 220, 222, 224 associated with the FMS 150) to select text box or other GUI element to define an altitude target for a waypoint of the flight plan. In response to user selection of a GUI element to define an altitude value, the FMS application may transmit or otherwise provide an input context message to the user input management service 210 that identifies an altitude as the anticipated data type that the FMS application is expecting to receive from a user in response to user selection of the GUI element. The user input management service 210 then instantiates and maintains an association between the FMS application and an altitude data type (e.g., using cache or some other temporary or local data storage associated with the user input management service 210). In this manner, the user input management service 210 effectively subscribes an interactive application 220, 222, 224 to a particular input data type.

The user input management service 210 monitors and analyzes user inputs received via the various available user input devices 202 to detect or otherwise identify when the input data type associated with a received user input matches or otherwise corresponds to an anticipated data type associated with one or more of the interactive software applications 220, 222, 224 expecting to receive user input. In some implementations, the user input management service 210 analyzes the content of the received user input to identify the particular input data type associated with the received user input, and then matches that input data type to a particular interactive application 220, 222, 224 subscribed to that particular input data type. For example, the user input management service 210 may analyze the content of received user input to verify or otherwise confirm any numerical values contained therein are valid or otherwise permissible for a particular input data type and determines whether the received user input includes any other indicia of that particular input data type, such as, for example, specification of particular units of measurement associated with that particular input data type. Thus, in response to a received user input including a numerical value of 20,000 along with feet as the units of measurement associated with that numerical value, the user input management service 210 may determine the received user input corresponds to the altitude data type and then identify the FMS application as being actively subscribed to the altitude data type.

In other implementations, the user input management service 210 may receive indication of the input data type associated with the received user input in connection with receiving an input numerical value. For example, the user input may be provided in connection with one or more GUI elements on a GUI display 230, 232, 234 of an interactive application 220, 222, 224 that includes radio buttons, drop-down menus, or other GUI elements that allow the user to select or otherwise designate, from among a list of potential input data types, the particular data type to be associated with a received user input being provided via a text box or other GUI element associated with that data type selection GUI element. In this regard, it should be noted that depending on the implementation, the user input and associated input data type may be input or otherwise provided via the GUI display 230, 232, 234 of an interactive software application 220, 222, 224 that may be the same as or different from the interactive software application 220, 222, 224 receiving that user input. For example, in some implementations, interaction with the FMS application to initiate user input may be utilized by the user input management service 210 to establish an association between a particular user input device and the particular GUI element(s) or input data type selected via the FMS application, such that a subsequent user input value received via that particular user input device is automatically designated or indicated as having the input data type that was previously-selected or previously-configured and communicated to the user input management service 210 by the FMS application prior to the user's data entry.

When the user input management service 210 identifies or otherwise determines a received user input matches or otherwise corresponds to an anticipated data type that one or more interactive software applications 220, 222, 224 are subscribed to or otherwise expected to receive, the user input management service 210 broadcasts or otherwise transmits a message that includes or otherwise indicates the input data value provided by the user along with the input data type associated with the input data value contained in the message. In some implementations, the user input management service 210 supports a publish-subscribe messaging scheme, where the user input management service 210 broadcasts a respective message stream including the input numerical or textual value of the received user input with an identifier of the particular data type that is utilized by the software applications 220, 222, 224 to determine whether or not to receive and respond to the respective message stream when the broadcasted input data type matches the anticipated input data type for the respective application 220, 222, 224. In this manner, the software applications 220, 222, 224 may determine which message streams should be responded to and which message streams should be ignored by the respective application 220, 222, 224.

Figure 3:
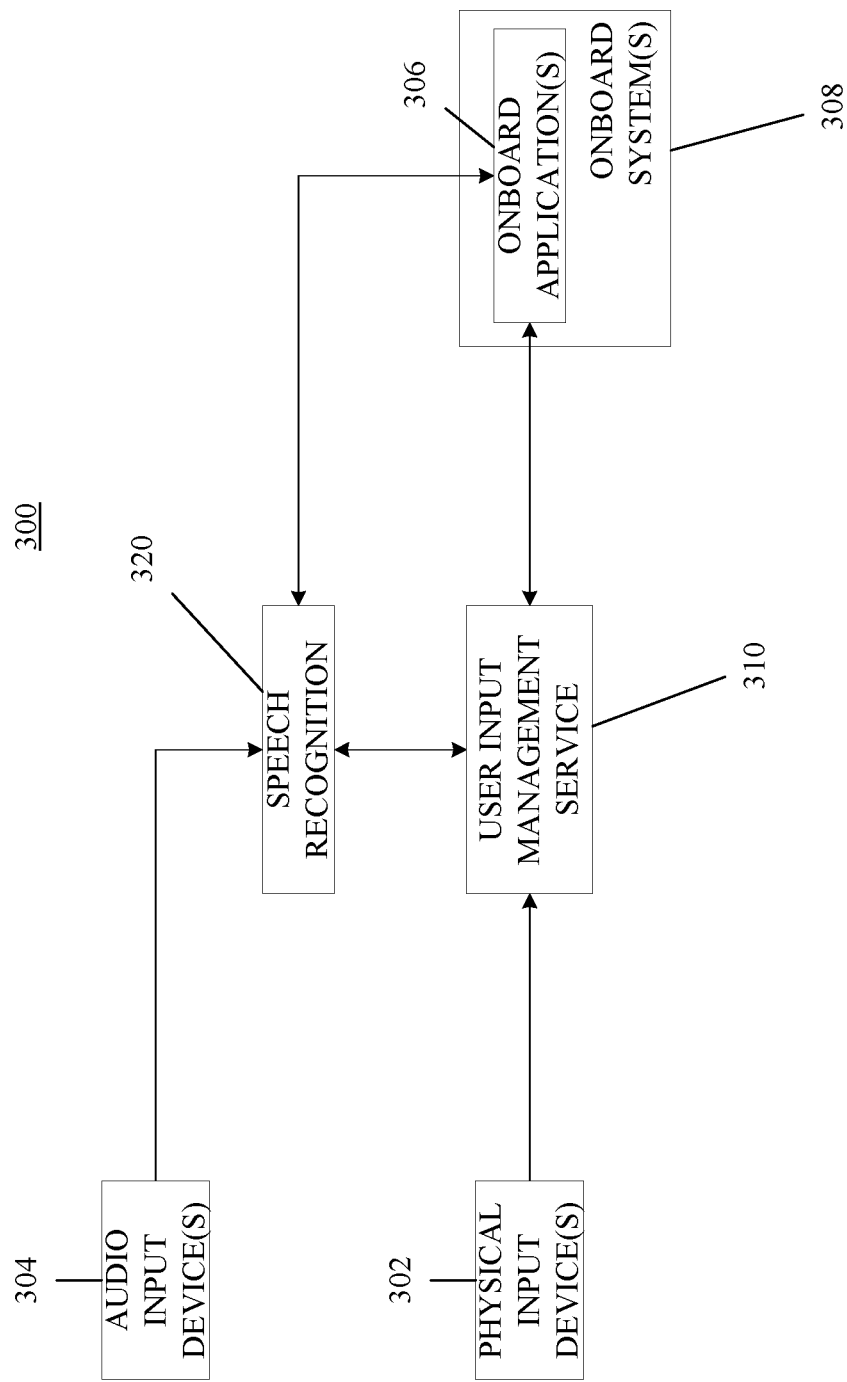
FIG. 3 is a block diagram of an interactive computing system suitable for use with the aircraft system of FIG. 1 or the display system of FIG. 2 in an exemplary embodiment.

FIG. 3 depicts an exemplary embodiment of an interactive computing system 300 suitable for use with a vehicle system (e.g., aircraft system 100 of FIG. 1) that includes user input devices 302, 304 (e.g., user input devices 140, 202) that are decoupled from interactive software applications 306 (e.g., software applications 220, 222, 224) at various onboard systems 308 (e.g., the FMS 150, the avionics systems 160, the navigation system 162, the communications system 164, and the like) via an intermediary user input management service 310 (e.g., user input management service 210). The various elements described in connection with FIG. 3 are similar to counterpart elements described above in the context of FIGS. 1-2 and for sake of brevity will not be redundantly described in the context of FIG. 3.

As depicted in FIG. 3, the interactive computing system 300 includes both physical user input devices 302, such as, for example, buttons, switches, keypads, touchpads, keyboards, mice, touch panels (or touchscreens), joysticks, knobs, line select keys, CCDs or any other suitable device for receiving a tactile or manual input from a user, along with audio user input devices 304, such as, for example, any sort of microphone, audio transducer, audio sensor, or the like capable of receiving voice, speech or other audio input. The physical user input devices 302 are coupled to the user input management service 310 to transmit, provide or otherwise communicate received user input to the user input management service 310, in a similar manner as described above in the context of FIG. 2. The audio input devices 304 are coupled to a speech recognition system 320, which generally represents the hardware, software, and/or firmware components that are configured to receive input audio signals corresponding to a voice command, convert the received voice command audio user input into a corresponding textual representation, and transmit or otherwise provide the textual representation of the audio user input to one or more destination applications 306 executing on or at one or more onboard systems 308 via the user input management service 310. For example, the speech recognition system 320 may include one or more analog-to-digital converters (ADCs) that receive audio signals from the audio input device(s) 304 and converts the received audio signals into a corresponding digital representation that is output, transmitted or otherwise provided to a speech recognition engine (or voice recognition engine) or other speech-to-text system, which, in turn, may utilize various filters, speech recognition vocabularies, neural networks, natural language processing (NLP), and/or the like to analyze, parse, or otherwise process the digitized audio input to convert the audio content into a corresponding textual representation.

In practice, the speech recognition system 320 may include or otherwise be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. Although FIG. 3 depicts the speech recognition system 320 and the user input management service 310 as being implemented separately (e.g., using separate instances of processing system 204), in practice, the speech recognition system 320 and the user input management service 310 may be integrated or otherwise combined, or the speech recognition system 320 and the user input management service 310 may be implemented at a common processing system (e.g., processing system 204).

As described in greater detail below, by virtue of the input context messages identifying the anticipated data types expected to be received by the onboard applications 306, the user input management service 310 may effectively route the audio user input received via the audio input device(s) 304 from the speech recognition system 320 to the appropriate onboard application(s) 306 while decoupling or otherwise abstracting the details of the onboard applications 306 from the speech recognition system 320. In this regard, the user input management service 310 may analyze the content of the textual representation of the audio user input to identify or otherwise determine the particular input data type contained therein, and then broadcast or otherwise route messages containing the user input value for that particular input data type to the appropriate destination onboard application (s) 306.

In one or more embodiments, the user input management service 310 transmits, communicates or otherwise provides indication of the anticipated data type(s) expected to be received by the onboard application(s) 306 to the speech recognition system 320, which, in turn, may be utilized by the speech recognition system 320 to improve the ability and performance of the speech recognition system 320 with respect to receiving that data type. For example, when a user interacts with an FMS application 306 to define an altitude target for a waypoint of the flight plan and provide a corresponding input context message to the user input management service 310, which in turn, provides an indication of an altitude as the expected input data type to the speech recognition system 320. In response, the speech recognition system 320 may dynamically adjust or adapt the speech recognition vocabularies or algorithms utilized by the speech recognition engine to improve the accuracy and/or response time with respect to subsequent audio user inputs that include numerical values or terminology related to defining an altitude target.

Figure 4:
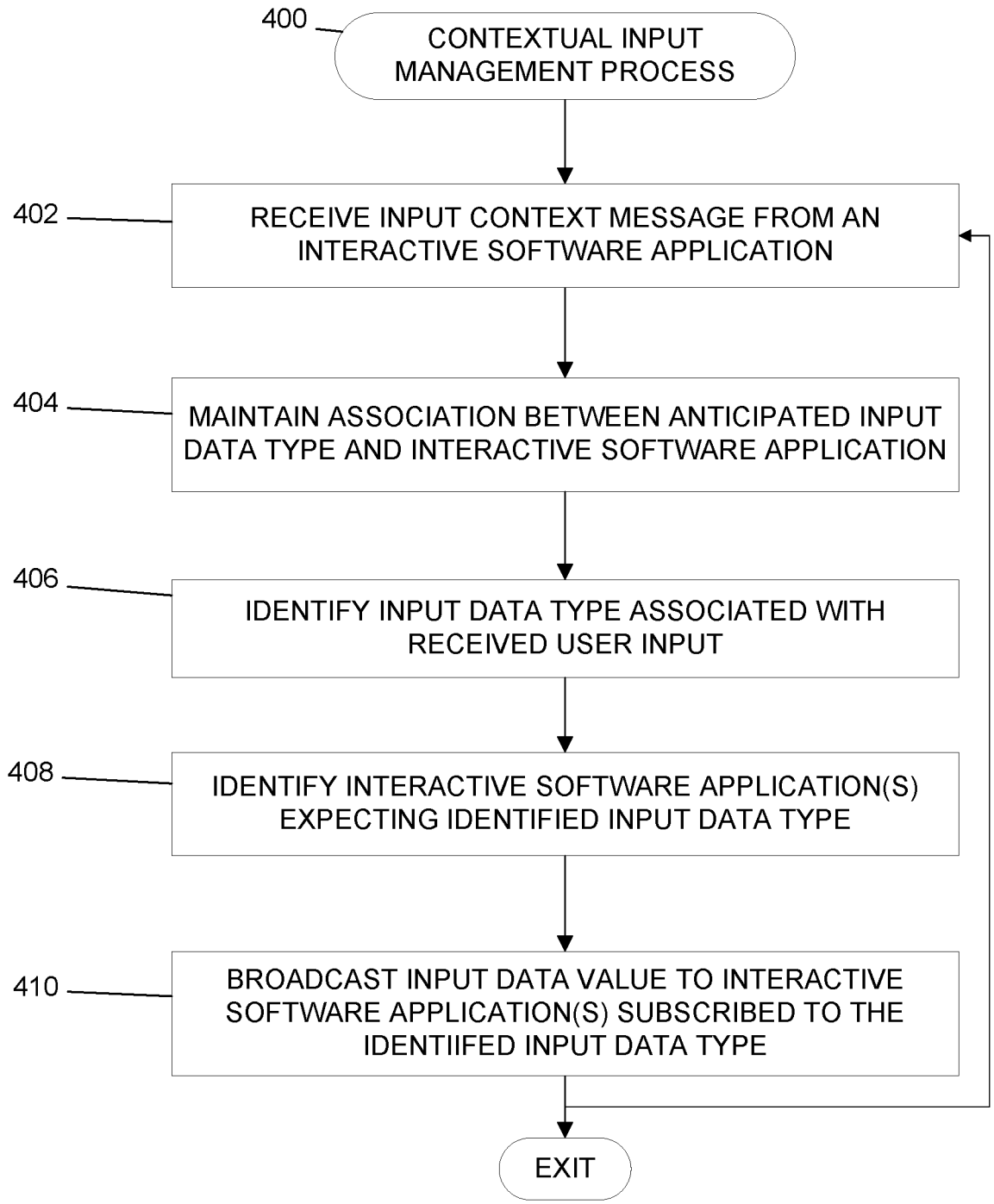
FIG. 4 is a flow diagram of a contextual input management process suitable for implementation by an interactive computing system associated with an aircraft system or another vehicle system in an exemplary embodiment.

FIG. 4 depicts an exemplary embodiment of a contextual input management process 400 suitable for implementation in a vehicle system to decouple input devices and destination software applications via an intermediary service (e.g., user input management service 310) using contextual information. The various tasks performed in connection with the illustrated process may be implemented using hardware, firmware, software executed by processing circuitry, or any combination thereof. For illustrative purposes, the following description may refer to elements mentioned above in connection with FIGS. 1-3. In practice, portions of the contextual input management process 400 may be performed by different elements of a vehicle system. That said, exemplary embodiments are described herein in the context of the contextual input management process 400 being primarily performed by a user input management service 210, 310 in connection with interactive software applications 220, 222, 224, 306. It should be appreciated that the contextual input management process 400 may include any number of additional or alternative tasks, the tasks need not be performed in the illustrated order and/or the tasks may be performed concurrently, and/or the contextual input management process 400 may be incorporated into a more comprehensive procedure or process having additional functionality not described in detail herein. Moreover, one or more of the tasks shown and described in the context of FIG. 4 could be omitted from a practical embodiment of the contextual input management process 400 as long as the intended overall functionality remains intact.

In the illustrated embodiment, the contextual input management process 400 initializes by receiving or otherwise obtaining an input context message from an interactive software application that includes indicia of an anticipated input data type expected to be received by the respective interactive software application or that the respective interactive software application would otherwise like to subscribe to (task 402). For example, a user may interact with a GUI 230, 232, 234 provided by a software application 220, 222, 224, 306 associated with the FMS 150 or another onboard system 160, 162, 164, 308 to change, configure, define or otherwise input a user-desired value for a particular parameter, variable or setting. In response, the application 220, 222, 224, 306 transmits or otherwise provides an input context message to the user input management service 210, 310 that indicates the respective application 220, 222, 224, 306 is ready to accept or receive an input value for a particular data type. For example, a pilot or co-pilot could interact with a GUI element associated with the aircraft heading (e.g., a heading-select control) on a PFD GUI 230, 232, 234 to initiate a change to the aircraft heading, which, in turn, results in the software application 220, 222, 224, 306 associated with the PFD GUI 230, 232, 234 providing an input context message to the user input management service 210, 310 that indicates the respective application 220, 222, 224, 306 is expecting to receive an input heading value. In an exemplary implementation, the input context message may include an application identifier associated with the respective application 220, 222, 224, 306, an input data type expected to be received (e.g., heading), and a path to the part of that application 220, 222, 224, 306 for receiving the input (e.g., a screen name, a control name within that screen, a sub control name within that control and/or the like). In some implementations, the applications 220, 222, 224, 306 are configurable to transmit or otherwise provide an inject input context message that identifies only the input data type expected to be received without specifying a path or destination for the input.

The contextual input management process 400 continues by establishing and maintaining an association between the particular input data type expected to be received and the respective software application anticipating that input data type (task 404). For example, the user input management service 210, 310 may instantiate a data structure in cache or another data storage element to maintain an association between the anticipated input data type identified in the received input context message and the application identifier associated with the interactive software application 220, 222, 224, 306 expecting that input data type. In this regard, it should be noted that more than one software application 220, 222, 224, 306 may be associated with or otherwise subscribed to a particular input data type, for example, by the user input management service 210, 310 maintain a list of the subset of software applications 220, 222, 224, 306 subscribed to a particular input data type.

Thereafter, when a user input is received, the contextual input management process 400 identifies or otherwise determines the input data type associated with the received user input and identified or otherwise determines the interactive software application(s) that are expecting to receive the identified input data type associated with the received user input (task 406, 408). In this regard, when a user interacts with a user input device 202, 302, 304, the user input device 202, 302, 304 or another software application 220, 222, 224, 306 associated with the user input received via the user input device 202, 302, 304 generates or otherwise provides a contextual input value message that includes identification of the input data type associated with the received user input, the value that was input for that input data type, the path or the part of the application 220, 222, 224, 306 where or via which the input was received (e.g., a screen name, a control name within that screen, a sub control name within that control and/or the like), an application identifier associated with the respective application 220, 222, 224, 306 and/or the like. Based on the identified input data type, the user input management service 210, 310 may utilize the list of software applications 220, 222, 224, 306 subscribed to different input data types to identify the particular subset of software applications 220, 222, 224, 306 subscribed to the received input data type.

After identifying the particular software applications subscribed to the received input data type, the contextual input management process 400 continues by broadcasting, transmitting or otherwise providing the received input value for the received input data type to the respective software applications subscribed to that particular input data type (task 410). In this regard, in some implementations, the user input management service 210, 310 supports a publish-subscribe messaging scheme and broadcasts a respective message stream including the input value of the received user input with indicia of the particular data type that is utilized by the software applications 220, 222, 224, 306 to determine whether or not to receive and respond to the respective message stream when the broadcasted input data type matches the anticipated input data type for the respective application 220, 222, 224, 306. In this manner, a user input value for a particular parameter, variable or setting may be broadcast or otherwise distributed to more than one software application 220, 222, 224, 306, thereby allowing multiple software applications 220, 222, 224, 306 to receive a common input data value via a user input device 202, 302, 304 that is decoupled from one or more of the software applications 220, 222, 224, 306.

It should be noted that although FIG. 4 is described in the context of a centralized implementation that utilizes a user input management service 210, 310 as an intermediary, in some implementations, the contextual input management process 400 may be implemented in a decentralized or distributed manner without reliance on an intermediary service. For example, the various input context messages and contextual input value messages described herein may be sent directly to/from software applications 220, 222, 224, 306 via a message-based communications channel that is indexed by an instance-number-based application identifier or any other suitable technique for uniquely identifying application instances (e.g., using human-readable names or the like). In such implementations, the configuration of a respective application 220, 222, 224, 306 may contain a list of application instance-numbers with which the application is capable of cooperating in order to send messages to that configured subset of applications. Thus, it is possible for several independent sets of applications to coordinate and cooperate to provide a user input value for a particular data type to applications interested in that value. In this regard, an input context message may be sent only once, using the communication channel associated with the sending application's instance number, thereby allowing multiple applications configured to receive input context messages via that application's channel to concurrently receive the input context message. In such implementations, applications capable of receiving or generating user input will each store or otherwise maintain an input context message in association with its associated application to know where to send any subsequently generated input of that type. Once the user has input a value of a particular data type, the generating application sends a contextual input value message to any application that previously indicated its interest in such input (e.g., by previously sending an input context message).

In one or more implementations, the contextual input management process 400 and/or the user input management service 210, 310 supports an input context editing message that is similar to a contextual input value message but includes an additional Boolean flag or other indicia of whether the input value is still being edited. In this regard, while a user is inputting or typing a value into a text box, the current interim value input for that particular parameter, variable or setting may be broadcasted to subscribed applications interested in that data type, thereby allowing a respective subscribed application to receive interim input values and display the current value or state of the user input where committed or confirmed values are normally displayed, thereby improving user experience and allowing a user to see the interim input value in an expected location to comport with user expectations while editing a value. For example, while a user is inputting an altitude value using a GUI element associated with a particular application, any other interactive software application that is subscribed to the altitude input data type may concurrently display the interim altitude value that is in the process of being defined by the user in lieu of the currently committed or previously confirmed value for that altitude parameter.

In some implementations, a subscribed application 220, 222, 224, 306 may transmit or otherwise provide an inject confirm cancel message to notify the user input management service 210, 310, the contextual input management process 400 and/or another application to provide an instance of a confirm/cancel dialog or other confirm/cancel GUI across several different applications 220, 222, 224, 306 or GUIs 230, 232, 234. As a result, several redundant instances of the same confirm/cancel dialog may be provided across different applications concurrently, where interaction with any one of the confirm/cancel dialogs (e.g., to accept or reject the received user input value) causes the other confirm/cancel dialogs to disappear or otherwise be removed from the other applications. For example, when a user attempts to input a value for a parameter, variable or other setting relating to safety critical operations, the inject confirm cancel message may be utilized instead of the input context message that includes an identifier associated with the confirm/cancel request along with human-readable text to display to the user describing the nature of the value or the parameter, variable or other setting being changed. As a result, one or more confirm/cancel dialogs with the same human-readable text and "confirm" and "cancel" options may be redundantly displayed across different applications 220, 222, 224, 306 and/or GUIs 230, 232, 234 subscribed to that input data type, thereby allowing the user to confirm the input value in any number of different ways.

In one or more exemplary implementations, the input context message may be utilized to subscribe a particular application 220, 222, 224, 306 to a particular input data type for an indefinite period of time, for example, to dynamically update that particular application 220, 222, 224, 306 substantially in real-time whenever the user modifies that particular variable or parameter. For example, whenever a user interacts with another application 220, 222, 224, 306 to modify a particular parameter, variable or other setting, subscribed applications 220, 222, 224, 306 different from the application 220, 222, 224, 306 the user is interacting with may dynamically update to reflect the most recently input value for that particular data type.

Figure 5:
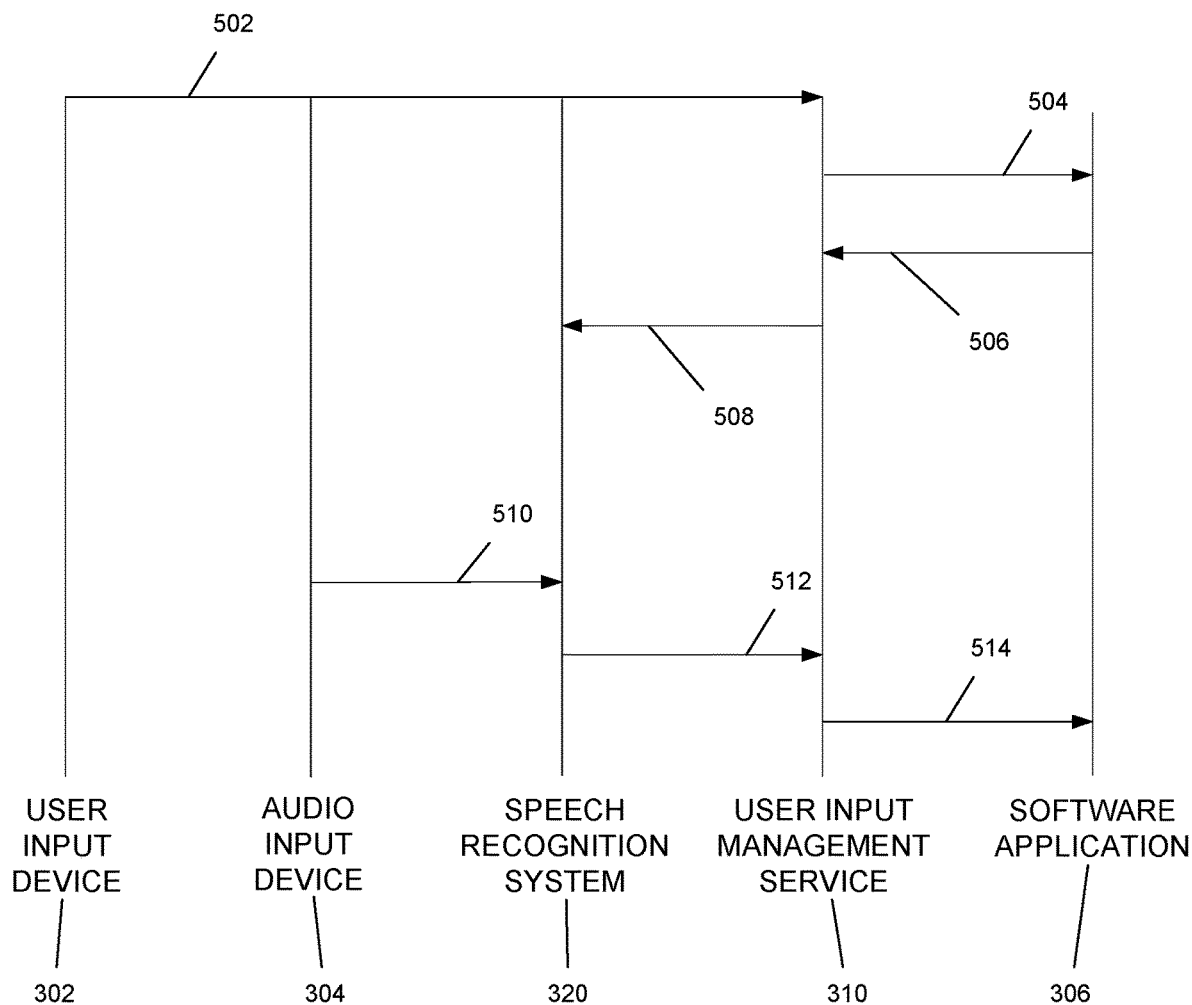
FIG. 5 depicts a sequence of communications within the interactive computing system of FIG. 3 in connection with one or more exemplary implementations of the contextual input management process of FIG. 4.

FIG. 5 depicts an exemplary sequence of communications within the interactive computing system 300 of FIG. 3 in connection with the system 200 of FIG. 2 in accordance with an exemplary embodiment of the contextual input management process 400 of FIG. 4. The illustrated sequence begins with a user manipulating a physical user input device 302 to interact with a particular location on a GUI display 230, 232, 234 depicted on a display device 130, 206 associated with an interactive software application 220, 222, 224, 306. The user input management service 210, 310 receives 502 the user input, and based on the particular user input device 302 and/or the location of the received user input, the user input management service 210, 310 identifies or otherwise determines the software application 220, 222, 224, 306 responsible for responding to the received user input. The user input management service 210, 310 then transmits or otherwise provides 504 indicia of the received user input to the responsible software application 220, 222, 224, 306. Examples of a user input management service 210, 310 identifying a software application responsible for responding to user input are described in greater detail in U.S. patent application Ser. No. 18/050,568, which is incorporated by reference herein.

The responsible software application 220, 222, 224, 306 analyzes the received user input to respond to the user input in accordance with the logic, settings or other configuration of the respective software application 220, 222, 224, 306, which is not germane to this disclosure. In response to determining the received user input corresponds to user selection or manipulating a GUI element or other interactive feature of the respective software application 220, 222, 224, 306 for modifying, changing or otherwise configuring a value, the software application 220, 222, 224, 306 identifies the particular parameter, variable or setting associated with the GUI element and then transmits or otherwise provides 506 an input context message that identifies the anticipated input data type that the software application 220, 222, 224, 306 is expecting to receive in response to user selection of the GUI element. For example, the user may interact with a GUI display 230 associated with an FMS application 220, 306 to manipulate a GUI element to define an altitude target for a waypoint of the flight plan (e.g., at 502 and 504), which, in turn results in the FMS application 220, 306 providing an input context message to the user input management service 210, 310 that identifies an altitude as the anticipated data type that the FMS application is expecting to receive in response to user selection of the GUI element.

In response to receiving 506 the input context message, the user input management service 210, 310 may store or otherwise maintain an association between the respective software application 220, 222, 224, 306 and the anticipated input data type identified by the input context message. As described above in the context of FIG. 3, in some implementations, the user input management service 210, 310 may transmit or otherwise provide 508 indication of the anticipated input data type to a speech recognition system 320 to adapt or tailor the speech recognition engine in anticipation of receiving that input data type. In some implementations, the user input management service 210, 310 may transmit or otherwise provide the input context message to the speech recognition system 320 for establishing an association between the anticipated input data type and the destination software application 220, 222, 224, 306 at the speech recognition system 320.

Still referring to FIG. 5, the user may subsequently interact with an audio input device 304 to provide 510 an audio user input that is received by the speech recognition system 320. The speech recognition system 320 parses or otherwise analyzes the audio user input to identify a user input value for a particular parameter, variable or other setting as well as identifying that particular parameter, variable or other setting. Thereafter, the speech recognition system 320 may transmit or otherwise provide 512 a contextual input value message that includes identification of the input data type associated with the received user input and specifies the value that was input for that input data type. Based on the identified input data type, the user input management service 210, 310 may identify the software application 220, 222, 224, 306 that is subscribed to or otherwise expecting that input data type, and then broadcasts, transmits, or otherwise provides 514 a corresponding message to the destination software application 220, 222, 224, 306 that indicates the received input value derived from the audio user input.

For example, continuing the above example, the user may provide a voice command to set an altitude target via the audio input device 304, which, in turn is received and recognized by the speech recognition system 320 as a voice command to set an altitude target to a value specified in the audio. In response, the speech recognition system 320 may transmit or otherwise provide a contextual input value message that includes the decoded and recognized altitude value along with indication of an altitude target as the data type associated with the received audio user input, and in response, the user input management service 210, 310 may broadcast, transmit or otherwise route the input altitude value to the FMS application expecting to receive an altitude target. The software application 220, 222, 224, 306 utilizes the input value received via the audio input device 304 and the speech recognition system 320 in concert with the user selection of the GUI element (e.g., at 504) to dynamically update the software application 220, 222, 224, 306 or otherwise respond in an appropriate manner to the received input value for the input data type. For example, the FMS application 220, 306 may update the altitude target for the selected waypoint of the flight plan to the received user input value derived from the audio voice command.

By virtue of the contextual input management process 400, a user input value received via an audio input provided to a speech recognition system 320 may be routed or otherwise provided to the appropriate destination software application 220, 222, 224, 306 while effectively decoupling the speech recognition system 320 and the audio input device 304 from that particular software application 220, 222, 224, 306 and the physical user input devices 302 and/or the onboard systems 308 associated with that software application 220, 222, 224, 306. In this regard, the user is not required to specifically focus or target the speech recognition system to a particular destination software application target, and the same voice command can be configured to exhibit similar behavior or effects across different destination software applications. Additionally, the decoupling facilitates upgrading or modifying the user input devices 302, 304 and/or the speech recognition system 320 may be upgraded or modified without impacting the software applications 220, 222, 224, 306 and/or the onboard systems 308, while similarly, the software applications 220, 222, 224, 306 and/or the onboard systems 308 may be upgraded or modified without impacting the user input devices 302, 304 and/or the speech recognition system 320, thereby allowing an aircraft system or other vehicle system to be retrofitted or upgraded without impacting the ability of the system to support user interactions.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A method comprising:
receiving, by a user input management service, an input context message from an interactive application identifying an anticipated data type to be received by the interactive application;

maintaining, by the user input management service, an association between the anticipated data type and the interactive application;

analyzing, by the user input management service, content of a received user input including an input value to identify an input data type associated with the received user input; and when the input data type matches the anticipated data type, broadcasting, by the user input management service, a message including an indication of the input data type and the input value of the received user input for the input data type to the interactive application, wherein the interactive application responds to the input value for the input data type, wherein broadcasting the message comprises the user input management service communicating an inject confirm cancel message including the indication of the input data type, the input value of the received user input for the input data type and a dialog comprising human-readable text to confirm or cancel the input value, wherein the interactive application is configurable to display the dialog on a graphical user interface associated with the interactive application.

2. The method of claim 1, wherein the received user input comprises speech or a voice command.

3. The method of claim 1, further comprising receiving a second user input identifying the input data type associated with the received user input.

4. The method of claim 3, wherein the second user input comprises user selection of the input data type from among a list of potential input types.

5. The method of claim 1, wherein broadcasting the message comprises the user input management service communicating a contextual input value message including the indication of the input data type and the input value of the received user input for the input data type.

6. A method comprising:

receiving, by a user input management service, an input context message from an interactive application identifying an anticipated data type to be received by the interactive application;

maintaining, by the user input management service, an association between the anticipated data type and the interactive application;

identifying, by the user input management service, an input data type associated with a received user input; and when the input data type matches the anticipated data type, broadcasting, by the user input management service, a message including an indication of the input data type and an input value of the received user input for the input data type to the interactive application, wherein broadcasting the message comprises the user input management service communicating an inject confirm cancel message including the indication of the input data type, the input value of the received user input for the input data type and a dialog comprising human-readable text to confirm or cancel the input value, wherein the interactive application is configurable to display the dialog on a graphical user interface associated with the interactive application.

7. The method of claim 1, further comprising receiving, by the user input management service, a second message from a speech recognition system including the received user input and the indication of the input data type.

8. The method of claim 7, wherein the user input management service receives the input context message in response to user selection of a graphical user interface element of a graphical user interface display associated with the interactive application via a physical user input device different from an audio input device associated with the received user input, wherein the graphical user interface element is associated with the anticipated data type.

9. A non-transitory computer-readable medium having computer-executable instructions stored thereon that, when executed by a processing system, cause the processing system to:

receive an input context message from an interactive application identifying an anticipated data type to be received by the interactive application;

maintain an association between the anticipated data type and the interactive application;

analyze content of a received user input including an input value to identify an input data type associated with the received user input from a user input device;

when the input data type matches the anticipated data type, broadcast a message including an indication of the input data type and the input value of the received user input for the input data type to the interactive application, wherein the interactive application responds to the input value for the input data type; and communicate an inject confirm cancel message including the indication of the input data type, the input value of the received user input for the input data type and a dialog comprising human-readable text to confirm or cancel the input value, wherein the interactive application is configurable to display the dialog on a graphical user interface associated with the interactive application.

10. The computer-readable medium of claim 9, wherein the received user input comprises speech or a voice command.

11. The computer-readable medium of claim 9, wherein the instructions are configurable to cause the processing system to identify the input data type by receiving second user input identifying the input data type associated with the received user input.

12. The computer-readable medium of claim 11, wherein the second user input comprises user selection of the input data type from among a list of potential input types.

13. The computer-readable medium of claim 9, wherein the instructions are configurable to cause the processing system to communicate a contextual input value message including the indication of the input data type and the input value of the received user input for the input data type.

14. The computer-readable medium of claim 9, wherein the instructions are configurable to cause the processing system to receive a second message from a speech recognition system including the received user input and the indication of the input data type.

15. The computer-readable medium of claim 14, wherein the instructions are configurable to cause the processing system to receive the input context message in response to user selection of a graphical user interface element of a graphical user interface display associated with the interactive application via a physical user input device different from an audio input device associated with the received user input, wherein the graphical user interface element is associated with the anticipated data type.

16. The method of claim 1, wherein the anticipated data type comprises a particular unit of measurement.

17. The method of claim 16, wherein analyzing the content comprises analyzing the content to identify specification of the particular unit of measurement within the received user input.

18. The method of claim 1, wherein analyzing the content comprises verifying the input value is valid for the input data type.

19. The method of claim 18, wherein:
the anticipated data type comprises a particular unit of measurement;
analyzing the content comprises analyzing the content to identify specification of the particular unit of measurement within the received user input; and
verifying the input value is valid comprises verifying numerical values within the received user input are valid for the particular unit of measurement.

* * * * *